United States Patent
Ogallo et al.

(10) Patent No.: US 12,387,235 B2
(45) Date of Patent: Aug. 12, 2025

(54) SUBGROUP ANALYSIS IN A/B TESTING

(71) Applicant: International Business Machines Corporation, Armonk, NY (US)

(72) Inventors: William Ogallo, Nairobi (KE); Girmaw Abebe Tadesse, Nairobi (KE); Julian Bertram Kuehnert, Nairobi (KE); Skyler Speakman, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 17/655,816

(22) Filed: Mar. 22, 2022

(65) Prior Publication Data

US 2023/0325871 A1    Oct. 12, 2023

(51) Int. Cl.
*G06Q 30/0242* (2023.01)

(52) U.S. Cl.
CPC .............. *G06Q 30/0243* (2013.01)

(58) Field of Classification Search
None
See application file for complete search history.

(56) References Cited

U.S. PATENT DOCUMENTS

| | | | |
|---|---|---|---|
| 9,087,035 B1 * | 7/2015 | Bandaru | G06F 40/186 |
| 9,201,770 B1 | 12/2015 | Duerk | |
| 9,436,580 B2 | 9/2016 | Manion | |
| 10,482,477 B2 | 11/2019 | Gumm | |
| 10,621,677 B2 | 4/2020 | Mascaro | |
| 2009/0271324 A1 * | 10/2009 | Jandhyala | G06Q 10/10 705/26.1 |
| 2014/0278198 A1 * | 9/2014 | Lyon | G06Q 30/0201 702/179 |
| 2014/0280862 A1 * | 9/2014 | Aurisset | H04L 67/535 709/224 |
| 2016/0071162 A1 * | 3/2016 | Ogawa | G06Q 50/01 705/14.66 |
| 2016/0253683 A1 | 9/2016 | Gui | |
| 2019/0057096 A1 * | 2/2019 | Mitra | G06F 16/285 |
| 2019/0095828 A1 * | 3/2019 | Xu | G06Q 10/0635 |
| 2019/0227903 A1 * | 7/2019 | Sundaresan | G06F 11/368 |
| 2020/0027133 A1 * | 1/2020 | Segalov | G06F 21/6263 |
| 2020/0272672 A1 * | 8/2020 | Orlov | G06F 16/958 |
| 2021/0056458 A1 * | 2/2021 | Savova | G06N 20/00 |

(Continued)

OTHER PUBLICATIONS

Yu, Miao, Wenbin Lu, and Rui Song. "Online testing of subgroup treatment effects based on value difference." 2021 IEEE International Conference on Data Mining (ICDM). IEEE, 2021 (Year: 2021).*

(Continued)

*Primary Examiner* — Darlene Garcia-Guerra
(74) *Attorney, Agent, or Firm* — Stosch Sabo

(57) ABSTRACT

Described are techniques for A/B testing including a computer-implemented method of identifying, in an A/B testing database, a set of feature values with a statistically significant difference in A/B testing outcomes above a threshold. The method further includes partitioning records in the A/B testing database into a plurality of population strata according to the set of feature values. The method further includes performing A/B testing, and identifying heterogeneous outcomes of the A/B testing for respective strata of the plurality of population strata.

20 Claims, 11 Drawing Sheets

(56) References Cited

U.S. PATENT DOCUMENTS

2021/0120126 A1      4/2021  Dwyer
2021/0160247 A1*     5/2021  Gaddam .............. H04L 63/102
2021/0349811 A1*    11/2021  Quemy .............. G06F 11/3684
2021/0365969 A1*    11/2021  Lieu .................. G06Q 30/0201

OTHER PUBLICATIONS

"Diagnosing Sample Ratio Mismatch in A/B Testing", Microsoft Research, <https://www.microsoft.com/en-us/research/group/experimentation-platform-exp/articles/diagnosing-sample-ratio-mismatch-in-a-b-testing/>, Sep. 14, 2020, 6 pages.
Goldstein Scott, "A Novel Technique for A/B Testing Using Static Prototypes", Michigan Publishing, vol. 2, Issue 1, 2019, <https://quod.lib.umich.edu/w/weave/12535642.0002.101?view=text;rgn=main>, 18 pages.
Mell et al., "The NIST Definition of Cloud Computing", National Institute of Standards and Technology, Special Publication 800-145, Sep. 2011, 7 pages.
Tamburrelli et al., "Towards Automated A/B Testing", Research Gate, Aug. 2014, <https://www.researchgate.het/publication/264435539>, 16 pages.

* cited by examiner

```
1: age: Young~0.59
1: age: Old~0.62
1: race: African~0.6
1: race: Caucasian~0.59
1: race: Hispanic~0.61
1: race: African or Caucasian~0.6
1: race: African or Hispanic~0.61
1: race: Caucasian or Hispanic~0.6
1: residence: Rural~0.59
1: residence: Urban~0.62
```

500

```
2: age & race: Young & African~0.59
2: age & race: Young & Caucasian~0.6
2: age & race: Young & Hispanic~0.57
2: age & race: Young & (African or Caucasian)~0.59
2: age & race: Young & (African or Hispanic)~0.58
2: age & race: Young & (Caucasian or Hispanic)~0.58
2: age & race: Old & African~0.62
2: age & race: Old & Caucasian~0.59
2: age & race: Old & Hispanic~0.65
2: age & race: Old & (African or Caucasian)~0.61
2: age & race: Old & (African or Hispanic)~0.63
2: age & race: Old & (Caucasian or Hispanic)~0.62
2: age & residence: Young & Rural~0.58
2: age & residence: Young & Urban~0.59
2: age & residence: Old & Rural~0.6
2: age & residence: Old & Urban~0.64
2: race & residence: African & Rural~0.59
2: race & residence: African & Urban~0.62
2: race & residence: Caucasian & Rural~0.61
2: race & residence: Caucasian & Urban~0.58
2: race & residence: Hispanic & Rural~0.57
2: race & residence: Hispanic & Urban~0.66
2: race & residence: (African or Caucasian) & Rural~0.6
2: race & residence: (African or Caucasian) & Urban~0.6
2: race & residence: (African or Hispanic) & Rural~0.58
2: race & residence: (African or Hispanic) & Urban~0.64
2: race & residence: (Caucasian or Hispanic) & Rural~0.59
2: race & residence: (Caucasian or Hispanic) & Urban~0.62
```

502

```
3: age & race & residence: Young & African & Rural~0.57
3: age & race & residence: Young & African & Urban~0.61
3: age & race & residence: Young & Caucasian & Rural~0.59
3: age & race & residence: Young & Caucasian & Urban~0.6
3: age & race & residence: Young & Hispanic & Rural~0.59
3: age & race & residence: Young & Hispanic & Urban~0.55
3: age & race & residence: Young & (African or Caucasian) & Rural~0.58
3: age & race & residence: Young & (African or Caucasian) & Urban~0.6
3: age & race & residence: Young & (African or Hispanic) & Rural~0.58
3: age & race & residence: Young & (African or Hispanic) & Urban~0.58
3: age & race & residence: Young & (Caucasian or Hispanic) & Rural~0.59
3: age & race & residence: Young & (Caucasian or Hispanic) & Urban~0.57
3: age & race & residence: Old & African & Rural~0.61
3: age & race & residence: Old & African & Urban~0.62
3: age & race & residence: Old & Caucasian & Rural~0.64
3: age & race & residence: Old & Caucasian & Urban~0.56
3: age & race & residence: Old & Hispanic & Rural~0.55
3: age & race & residence: Old & Hispanic & Urban~0.77
3: age & race & residence: Old & (African or Caucasian) & Rural~0.62
3: age & race & residence: Old & (African or Caucasian) & Urban~0.59
3: age & race & residence: Old & (African or Hispanic) & Rural~0.58
3: age & race & residence: Old & (African or Hispanic) & Urban~0.69
3: age & race & residence: Old & (Caucasian or Hispanic) & Rural~0.59
3: age & race & residence: Old & (Caucasian or Hispanic) & Urban~0.66
```

SUBGROUP ANALYSIS IN A/B TESTING

BACKGROUND

The present disclosure relates to A/B testing, and, more specifically, to subgroup analysis for improving A/B testing.

A/B tests are randomized experiments for testing user experience. A/B tests include two variants—generically referred to as A and B—with the intent of determining which of the variants is more effective at achieving a conversion goal (e.g., a sign-up, a purchase, a download, clicking a link, etc.). In the digital field, A/B tests can be used to measure the effect of a software version or landing page as an average across a population of known users, and they can be used to draw insights about how different software designs could influence certain conversion goals.

SUMMARY

Aspects of the present disclosure are directed toward a computer-implemented method comprising identifying, in an A/B testing database, a set of feature values with a statistically significant difference in A/B testing outcomes above a threshold. The method further comprises partitioning records in the A/B testing database into a plurality of population strata according to the set of feature values. The method further comprises performing A/B testing. The method further comprises identifying heterogeneous outcomes of the A/B testing for respective strata of the plurality of population strata.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 5 illustrates tables generated by population strata modeling, in accordance with some embodiments of the present disclosure.

Figure 1:
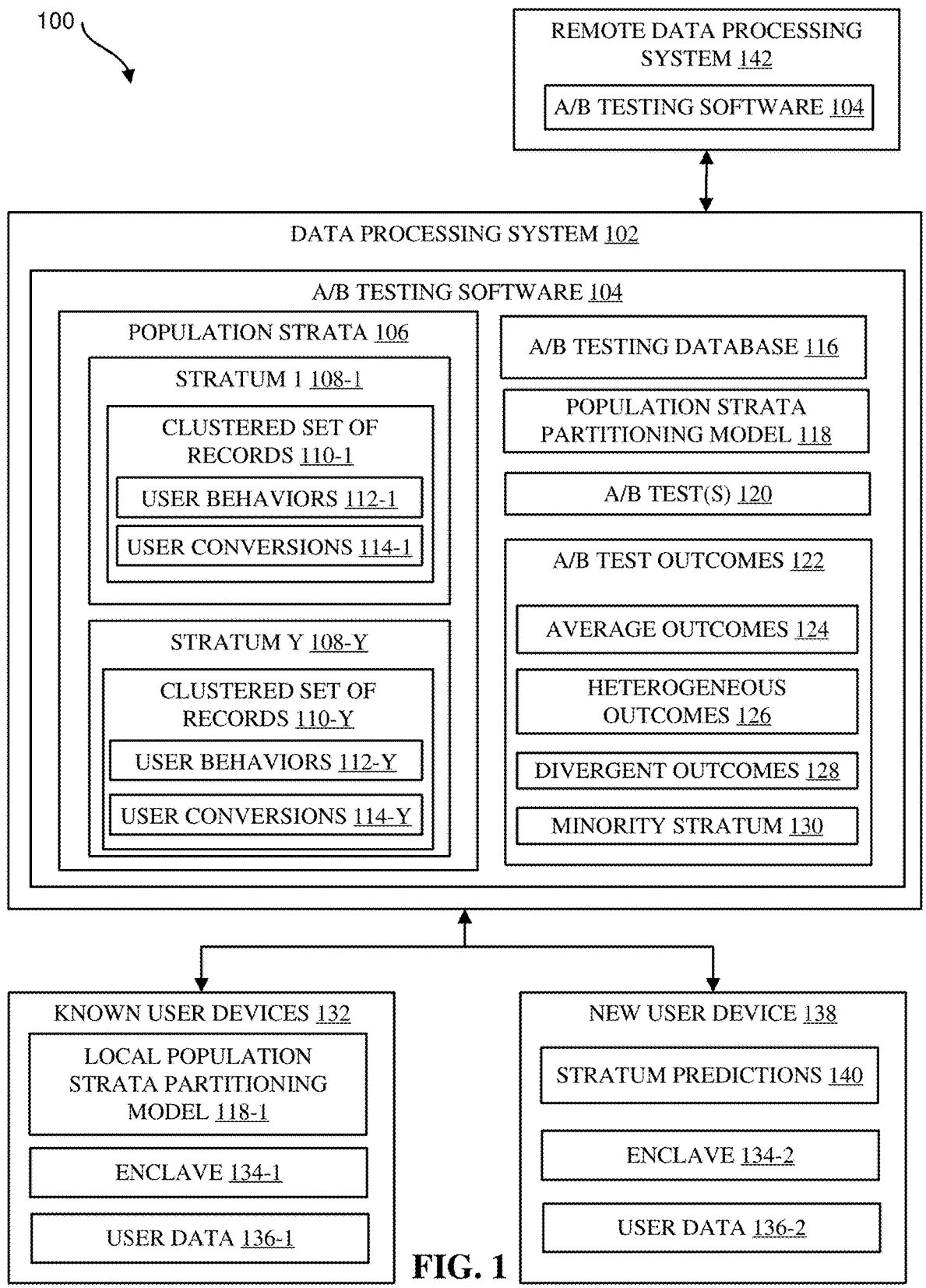
FIG. 1 illustrates a block diagram of an example computational environment including an A/B testing software suite, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward A/B testing, and, more specifically, to subgroup analysis for improving A/B testing. While not limited to such applications, embodiments of the present disclosure may be better understood in light of the aforementioned context.

Current A/B testing includes a number of challenges. One challenge of A/B testing is that it can consistently leave out the preferences of minority segments of a population of users insofar as software redesign decisions are based on a winning variant of a single population of known users. Another challenge is that the traditional approaches for conducting post-test segmentation (stratification of a population of users into subgroups) can reduce the statistical validity of the segmentation due to small sample sizes and/or statistically flawed hypothesis testing. To address this problem, targeted A/B tests can be manually created for specific segments of the population. Disadvantageously, manually targeted A/B tests are time and resource-intensive to perform and provide limited data.

Aspects of the present disclosure are directed toward an A/B testing software suite that realizes improved A/B testing. One aspect of the present disclosure involves considering the preferences of minority subgroups from prior A/B tests during the design of new A/B tests. In such embodiments, aspects of the present disclosure include an approach for discovering minority subgroups that consistently have lower-than-expected (or non-correlated or divergent) conversion rates and modifying the design of subsequent A/B tests with the potential requirements and/or preferences of these left-out subgroups.

More specifically, these aspects of the present disclosure can include one or more of: (1) at different time points, conducting an A/B test followed by segmentation to the majority and minority segments via a lattice-based clustering technique. The output of this can be: (a) a list of strata that can be used for stratified randomization in a next A/B test, and/or (b) a list of minority strata; and/or (2) at a subsequent timepoint, redesigning A/B tests using stratified randomization based on majority and minority strata identified in the previous time point. Advantageously, these embodiments of the present disclosure can identify groups that are consistently left out for targeted software design and personalization while also reducing the resources (time, money, etc.) needed to redesign and execute subsequent A/B tests for a specific left-out subgroup.

Additional aspects of the present disclosure are directed toward automatically triggering a redesign of an A/B test in response to a detected divergence of conversions. These aspects of the present disclosure include tracking the actual and expected longitudinal trajectories of user behaviors and user conversions across multiple population segments, detecting significant divergence in the actual versus expected trajectories, and triggering the redesign of the A/B test with variant modifications inferred from the users' behaviors (where the variant modifications are likely to increase user conversions).

More specifically, these aspects of the present disclosure can include, for a particular segment, monitoring the pattern of the expected and actual conversion goals for the segment. If a threshold (e.g., based on deviations between actual and expected goals, test frequency, costs, etc.) is satisfied, a new A/B test is automatically triggered for that segment. Advantageously, these aspects of the present disclosure can avoid the time and cost associated with manually identifying divergent outcomes and generating modified A/B tests in response to the divergent outcomes.

Additional aspects of the present disclosure are directed toward predicting membership (of individuals whose characteristics may not be known) to a stratum of a plurality of population strata (identified from a population with known characteristics) using surrogate features derived from edge device data. These aspects of the present disclosure can be realized by using a multiclass classification to predict membership of new users one or more of the pre-identified strata. In some embodiments, a population strata partitioning model is distributed to edge devices of known users and locally trained on the edge devices. The training results (e.g., parameters) can then be aggregated at the population strata partitioning model, and the population strata partitioning model can then be used to match a new user to one or more of the population strata. Advantageously, these aspects of the present disclosure enable inclusion and extension of A/B testing and minority aware A/B test redesign across larger populations based on edge device data.

Referring now to the figures, FIG. 1 illustrates a block diagram of an example computational environment 100 including A/B testing software 104, in accordance with some embodiments of the present disclosure. Computational environment 100 includes a data processing system 102 that is communicatively coupled to a remote data processing system 142, known user devices 132, and new user device 138 by a network. Data processing system 102, remote data processing system 142, known user devices 132, and new user device 138 can be any physical or virtual computational systems now known or later developed, such as, but not limited to, a desktop, laptop, server, mainframe, virtual machine (VM), tablet, smartphone, or another computational system.

Data processing system 102 includes A/B testing software 104. In some embodiments, A/B testing software 104 is downloaded, partially or entirely, to the data processing system 102 and from the remote data processing system 142. In other embodiments, A/B testing software 104 is provisioned, partially or entirely, to the data processing system 102 and from the remote data processing system 142. In some embodiments, remote data processing system 142 meters usage of the A/B testing software 104 on the data processing system 102 and can generate an invoice based on the metered usage.

A/B testing software 104 provides a suite of improved A/B testing capabilities such as, but not limited to: (i) improved clustering of A/B testing database 116 using a population strata partitioning model 118; (ii) improved A/B tests 120 based on temporally encoded user behaviors 112 and user conversions 114 from previous A/B tests for each of the population strata 106; (iii) automatically generated A/B tests 120 that are revised in response to a detected divergent outcome 128 (e.g., observed user conversions 114 below an expected user conversion rate by a threshold amount); (iv) automatically generated A/B tests 120 targeting a minority stratum 130 (e.g., a group of individuals that are repeatedly in the minority (losing) side of previous A/B tests 120); (v) federated training of a population strata partitioning model 118 using known user devices 132; and/or (vi) accurate stratum predictions 140 for new user devices 138.

First, A/B testing software 104 can be configured to generate population strata 106 from a A/B testing database 116 using a population strata partitioning model 118. A/B testing database 116 can include feature values for many (e.g., hundreds, thousands, millions, etc.) of individuals such as, but not limited to, age, gender, location, and a myriad of other characteristics that may be statistically significant for purposes of A/B testing. A/B testing database 116 can further include information related to outcomes of previous A/B tests such as which variant was provided and what outcome resulted from the provided variant.

Though this disclosure may implicitly or explicitly refer to the collection of personal data, it is noted that in embodiments, users opt-in to any system collecting and/or sharing personal data. In doing so, they are informed of what data is collected and how it will be used, that any collected personal data may be encrypted while being used, that users can opt-out at any time, and that if they opt-out, any personal data of the user is deleted. Furthermore, any discussion of personal data discussed herein should be construed to comply with any relevant laws and/or standards (e.g., General Data Protection Regulation (GDPR), Health Insurance Portability and Accountability Act (HIPAA), etc.).

Population strata partitioning model 118 can use the information in A/B testing database 116 to generate population strata 106. In some embodiments, population strata partitioning model 118 uses lattice-based clustering techniques to generate the population strata 106. In some embodiments, the population strata partitioning model 118 evaluates various combinations of feature values in A/B testing database 116 to identify a set of feature values that has a highest difference (or a difference above a threshold) in conversions between variants (and that is also statistically valid). The population strata partitioning model 118 can output population strata 106. Population strata 106 includes a plurality of strata such as stratum 1 108-1 to stratum Y 108-Y (where Y represents any positive integer). Each stratum 108 includes a clustered set of records 110 from the A/B testing database 116 (e.g., clustered set of records 110-1 corresponding to stratum 1 108-1, clustered set of records 110-Y corresponding to stratum Y 108-Y). For example, the population strata 106 can be created according to the set of feature values such that each stratum 108 includes all records in A/B testing database 116 that satisfy a given combination of sub-categories for each of the set of feature values.

In some embodiments, the population strata partitioning model 118 utilizes federated learning to generate and/or refine the population strata partitioning model 118. For example, aspects of the present disclosure can provide a local population strata partitioning model 118-1 to known user devices 132 (e.g., user devices belonging to individuals in the A/B testing database 116 that are assigned to one of the population strata 106). The local population strata partitioning model 118-1 can collect user data 136-1 from the known user devices 132 and train the local population strata partitioning model 118-1 using the user data 136-1. In some embodiments, the local population strata partitioning model 118-1 and any user data 136-1 sent to the local population strata partitioning model 118-1 can be securely processed in an enclave 134-1 of the known user devices 132. As used herein, the enclave 134-1 can refer to a single, common, continuous security perimeter providing computational security to a set of computer resources.

Once the local population strata partitioning model 118-1 is locally trained on each of the known user devices 132, the parameters of the local population strata partitioning model 118-1 can be returned to the population strata partitioning model 118 in the data processing system 102. The population strata partitioning model 118 can then combine the collected parameters to train, refine, and/or update the population strata partitioning model 118, thereby improving the accuracy of the population strata partitioning model 118 and/or reducing computational resource usage of the data processing system 102.

Meanwhile, a new user device 138 (corresponding to a user that is not part of the A/B testing database 116) can send user data 136-2 to the population strata partitioning model 118 and receive stratum predictions 140 from population strata partitioning model 118. In some embodiments, the new user device 138 utilizes an enclave 134-2 as previously discussed with respect to enclave 134-1 to securely store, process, and/or transmit data. In some embodiments, the new user corresponding to the new user device 138 is added to the A/B testing database 116 and one or more stratum 108. In some embodiments, the population strata partitioning model 118 utilizes hard matching and places the new user corresponding to the new user device 138 in one and only one stratum 108 (e.g., a best matched stratum). In other embodiments, the population strata partitioning model 118 utilizes soft matching and includes numerous stratum predictions 140 corresponding to two or more of the population strata 106. In these embodiments, each of the numerous stratum predictions 140 can include a probability, rank, accuracy, confidence, and/or other value indicative of the strength of each match.

The A/B testing software 104 further includes A/B tests 120. A/B tests 120 can refer to statistical tests that are designed to test two variants in interface, software, landing pages, and/or other aspects of a digital environment on users of the A/B testing database 116. The A/B tests 120 can be generated with characteristics predicted to achieve conversion goals for one or more of the population strata 106. In some embodiments, A/B tests 120 can be generated with knowledge of prior user behaviors 112 and/or user conversions 114 for the plurality of population strata 106. For example, user behaviors 112 and/or user conversions 114 can be recorded for each individual in each stratum 108 for previously performed A/B tests 120 (e.g., user behavior 112-1 and user conversion 114-1 corresponding to stratum 1 108-1, and user behaviors 112-Y and user conversions 114-Y corresponding to stratum Y 108-Y). User behaviors 112 can refer to times (e.g., dates, time of day, dwell time, usage time, time on page, etc.), locations, and/or other user behaviors relevant to A/B testing. User conversions 114 can refer to which variant of an A/B test 120 was applied to which individual, and an outcome associated with the tested variant. This prior knowledge of user behaviors 112 and/or user conversions 114 can be used to design more effective A/B tests 120 in the future.

A/B tests 120 can also be modified in response to divergent outcomes 128. Divergent outcomes 128 can refer to a difference above a threshold between a predicted outcome (e.g., conversion percentage) and an observed outcome for one or more of the population strata 106 in an A/B test 120. When such a divergent outcome 128 is identified, aspects of the present disclosure can automatically reformulate one or more A/B tests 120 that may reduce the divergence. The reformulated one or more A/B tests 120 can then be performed.

A/B tests 120 can also refer to A/B tests that are designed specifically for minority stratum 130. Minority stratum 130 can refer to a stratum 108 (or a group of individuals aggregated from multiple of the population strata 106) that repeatedly loses to other groups in A/B testing (e.g., where a winning subgroup selects variant A, and the minority stratum 130 selects variant B). Once the minority stratum 130 loses a predetermined ratio of A/B tests 120, aspects of the present disclosure can design one or more A/B tests 120 catering to the preferences of the minority stratum 130 (e.g., using user behaviors 112, user conversions 114, and/or other data known about the minority stratum 130). Furthermore, any redesigned A/B tests 120 can be performed on a test population where the minority stratum 130 has equal representation as one or more other stratum 108. In doing so, aspects of the present disclosure can further characterize the preferences of the minority stratum 130 (which would otherwise be ignored using traditional, majority-driven A/B testing). Although the minority stratum 130 is generally described as one of the stratum 108 in the present disclosure, the minority stratum 130 can also be aggregated from more than one stratum 108 in situations where the minority stratum 130 may share characteristics that are otherwise unknown to the population strata partitioning model 118.

Finally, A/B testing software 104 includes A/B test outcomes 122 useful for post-hoc analysis. A/B test outcomes 122 can include average outcomes 124 (e.g., the overall preference for variant A or variant B for the A/B testing database 116), heterogeneous outcomes 126 (e.g., preferences for variant A or variant B by individual population strata 106), divergent outcomes 128 (as previously discussed), and minority stratum 130 (as previously discussed).

As will be appreciated by one skilled in the art, FIG. 1 is presented for example purposes only, and many alternative configurations fall within the spirit and scope of the present disclosure. For example, A/B testing database 116 need not necessarily reside in the data processing system 102. In other embodiments, the A/B testing database 116 can reside distant from the data processing system 102 (such as in remote data processing system 142).

Figure 2:
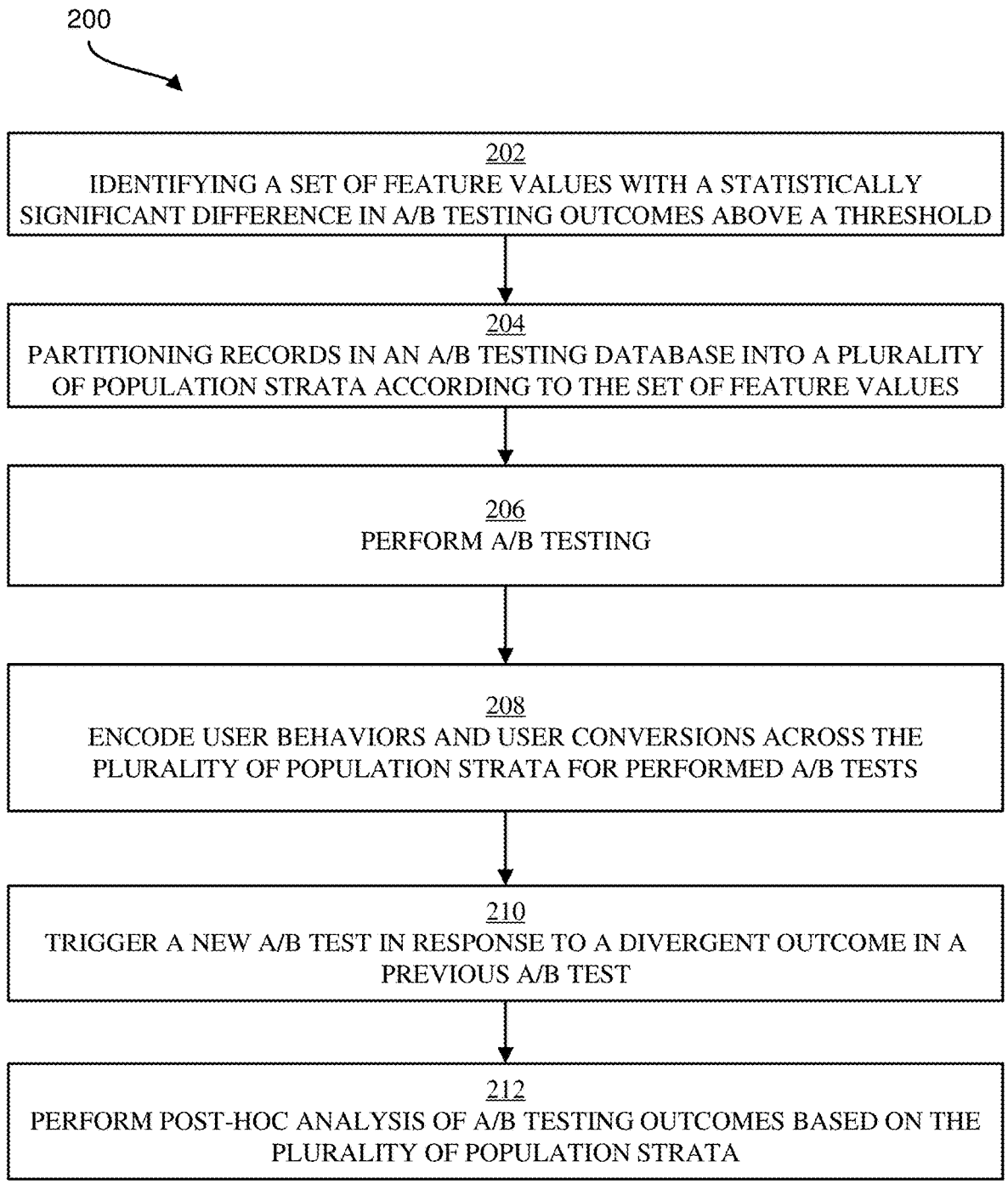
FIG. 2 illustrates a flowchart of an example method for determining population strata, performing A/B testing, and triggering new A/B testing, in accordance with some embodiments of the present disclosure.

FIG. 2 illustrates a flowchart of an example method 200 for determining population strata 106, performing A/B tests 120, and triggering new A/B tests 120, in accordance with some embodiments of the present disclosure. In some embodiments, the method 200 is implemented by a computer, a server, a processor, a data processing system (e.g., data processing system 102, remote data processing system 142 of FIG. 1), a user device (e.g., known user device 132, new user device 138 of FIG. 1), or another configuration of hardware and/or software.

Operation 202 includes identifying a set of feature values with a statistically significant difference in A/B testing outcomes above a threshold. Operation 202 can include inputting data from A/B testing database 116 into the population strata partitioning model 118. In some embodiments, operation 202 utilizes recursive data partitioning on lattice-based clusters of individuals in the A/B testing database 116 to generate the population strata 106. In some embodiments, each of the records in the A/B testing database 116 is associated with one and only one stratum 108 of the plurality of population strata 106. Operation 202 is discussed in more detail hereinafter with respect to FIGS. 3-5.

Operation 204 includes partitioning records in an A/B testing database into a plurality of population strata 106 according to the set of feature values. Operation 206 includes performing A/B tests 120. In some embodiments, the A/B tests 120 are designed for (e.g., targeted to) one or more stratum 108 of the population strata 106. In other embodiments, the A/B tests 120 are performed and the plurality of population strata 106 are overlayed with the results of the A/B tests 120 during post-test analysis to better understand which stratum 108 preferred which variants in the A/B test 120 (e.g., see operation 210).

Operation 208 includes encoding user behaviors 112 and user conversions 114 for the plurality of population strata 106 in response to performing one or more A/B tests 120. The user behaviors 112 and/or user conversions 114 can be encoded in the plurality of population strata 106, the A/B testing database 116, the population strata partitioning model 118, and/or in another location. In some embodiments, operation 206 occurs in approximately real-time, such that for a first A/B test 120, user behaviors 112 and/or user conversions 114 are encoded, and these encoded user behaviors 112 and/or user conversions 114 can be used to educate the design of a subsequent A/B test 120.

Operation 210 includes triggering a new A/B test 120 in response to a divergent outcome 128 for a previous A/B test 120. In some embodiments, the divergent outcome 128 is a difference between an expected outcome (e.g., conversion rate) and an observed outcome, where the difference exceeds a threshold. In some embodiments, the new A/B test 120 includes variants configured to reduce the difference between the expected outcome and the observed outcome. Operation 210 can utilize user behaviors 112 and/or user conversions 114, among other variables and factors, to create the new A/B test 120.

Operation 212 includes performing post-hoc analysis of A/B testing outcomes based on the plurality of population strata 106. In some embodiments, operation 212 includes characterizing average outcomes 124, heterogeneous outcomes 126, divergent outcomes 128, and/or identifying minority stratum 130. In some embodiments, operation 212 includes identifying a minority stratum 130 with heterogenous outcomes 126 and/or divergent outcomes 128. Advantageously, heterogeneous outcomes 126 can characterize variant preferences by population strata 106, thereby enabling future A/B tests 120 to be designed for specific population strata 106. As another advantage, divergent outcomes 128 can be used to automatically trigger modifications to A/B tests 120 when expected outcomes differ from observed outcomes above a threshold amount. As yet another advantage, identifying a minority stratum 130 can enable aspects of the present disclosure to generate A/B tests 120 for a subset of the A/B testing database 116 that would otherwise remain unserved given the majority-driven nature of A/B testing.

Figure 3:
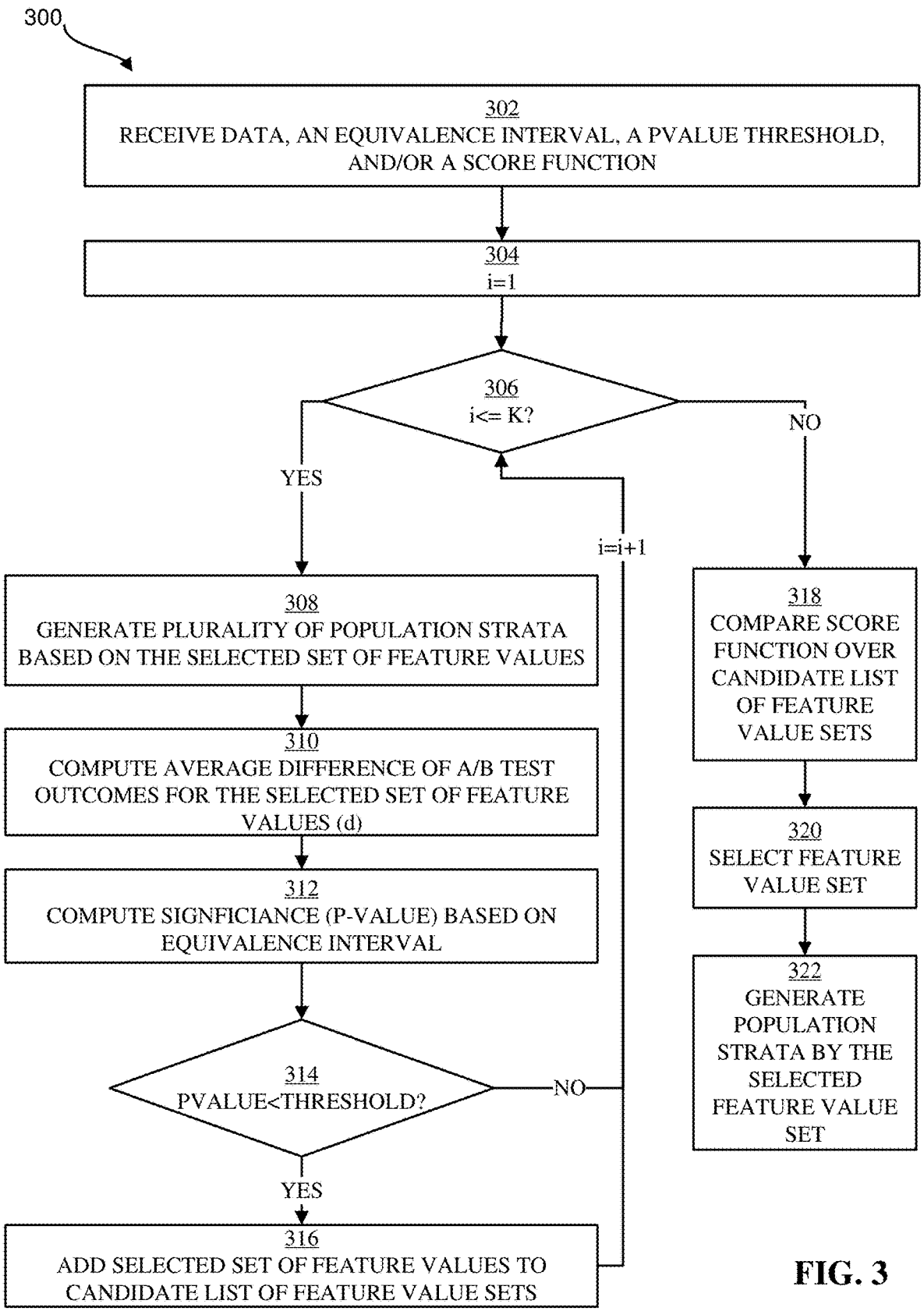
FIG. 3 illustrates a flowchart of an example method for determining a plurality of population strata for A/B testing, in accordance with some embodiments of the present disclosure.

FIG. 3 illustrates a flowchart of an example method 300 for determining a plurality of population strata 106 from an A/B testing database 116, in accordance with some embodiments of the present disclosure. In some embodiments, the method 300 is implemented by a computer, a server, a processor, a data processing system (e.g., data processing system 102, remote data processing system 142 of FIG. 1), a user device (e.g., known user device 132, new user device 138 of FIG. 1), or another configuration of hardware and/or software. In some embodiments, the method 300 is a sub-method of operation 202 of FIG. 2.

Operation 302 includes receiving one or more of data (e.g., data from A/B testing database 116), an equivalence bound, a p-value threshold, and/or a score function. The data from A/B testing database 116 can include numerous records corresponding to individuals. Each of the records can be associated with various features that may be relevant for understanding preferences in A/B testing (e.g., gender, age, race, location, etc.). Furthermore, each of the records can be associated with one or more A/B test indicators (e.g., representing whether each record was given a variant A or variant B of a previous test) and one or more A/B test outcomes (e.g., representing whether each record for each A/B test resulted in a conversion or not). The equivalence bound can be used to determine whether or not a null hypothesis of an equivalence test is satisfied (e.g., in equivalence testing, the null hypothesis assumes a statistically significant effect). The p-value can be related to a probability (e.g., confidence) required to reject the null hypothesis. The score function can be based on a significance of a given feature set as it relates to A/B testing outcomes. For example, the score function can be a difference (d) between a conversion rate for a first variant (e.g., A) versus a conversion rate for a second variant (e.g., B).

Operation 304 sets i=1, where i represents a size of a feature set. In other words, by setting i=1, operation 304 determines the relevance of each individual feature on A/B testing outcomes. Operation 306 determines if i is less than or equal to K, where K represents the number of features included in the A/B testing database 116. If i is less than or equal to K (306: YES), then the method 300 proceeds to operation 308.

Operation 308 includes generating a plurality of population strata 106 based on the selected set of feature values defined in operation 306. For example, if i=1, then operation 308 generates population strata 106 corresponding to each feature value. For example, if there are two feature values in the A/B testing database (e.g., location and operation system (O/S)) and each feature value has two classifications (e.g., rural or urban for location, Windows or iOS for O/S), then operation 308 would generate population strata 106 according to each of the feature values (e.g., separating all records in A/B testing database 116 into two population strata 106 corresponding to urban and rural based on the location feature value, and separating all records in A/B testing database 116 into another two population strata 106 corresponding to Windows and iOS for the O/S feature value). Similarly, if i=2, then operation 308 generates population strata 106 for each combination of two feature values.

Operation 310 includes computing an average difference of A/B test outcomes for the plurality of population strata 106 generated according to the selected set of feature values. Operation 310 can characterize a magnitude of an effect that various feature values (or combinations of feature values) have on determining an A/B test outcome.

Operation 312 includes computing a significance (e.g., p-value) for the average difference based on the equivalence interval. Operation 312 utilizes a p-value to determine whether any effect identified in operation 310 is statistically significant. Operation 314 includes determining whether each computed p-value for feature set is less than the p-value threshold (defined in operation 302). If so (314: YES), the selected set of feature values is added to a list of candidate feature value sets in operation 316, and the method 300 then iterates to a next i-value (e.g., i=i+1) and returns to operation 306. If not (314: NO), the selected set of feature values is pruned (e.g., removed, deleted, etc.) from the candidate list of feature values sets and the method 300 iterates to a next i-value (e.g., i=i+1) and returns to operation 306.

Referring back to operation 306, if i>K (e.g., there is no next set size of feature values to iterate to) (306: NO), then the method 300 proceeds to operation 318. Operation 316 includes comparing a score function over the candidate list of feature value sets. In some embodiments, the score function is a difference in conversion rates between test variants (e.g., the average difference determined in operation 310). Operation 320 includes selecting a feature value set from the candidate list of feature value sets according to the score function. In some embodiments, operation 320 selects a feature value set that generates a largest (e.g., maximum) average difference (d). In such embodiments, the selected feature value set can have the largest statistically significant explanatory power (and/or predictive power) for explaining and/or predicting conversion outcomes for A/B testing variants.

Operation 322 includes generating the plurality of population strata 106 using the selected feature value set. In other words, operation 322 partitions records in the A/B testing database 116 into population strata 106 by the feature values defined in the selected feature value set.

Figure 4:
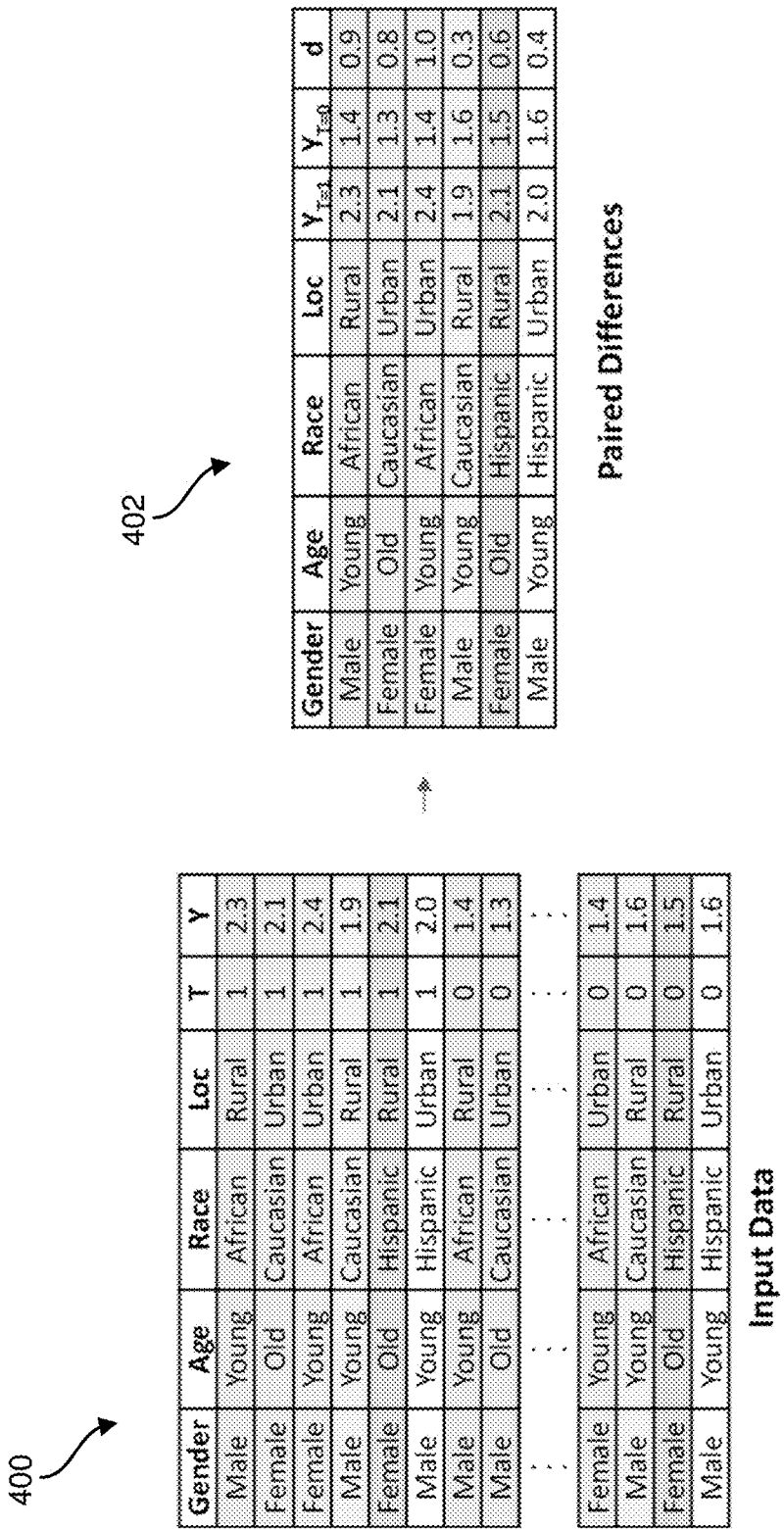
FIG. 4 illustrates a table of paired differences in an A/B testing database, in accordance with some embodiments of the present disclosure.

FIG. 4 illustrates a table 402 of paired differences in an A/B testing database 116, in accordance with some embodiments of the present disclosure. As shown in FIG. 4, a table 400 of input data can include feature values such as gender, age, race, and location. The table 400 of input data can further include a T-value representing a variant (e.g., whether a record received variant 1 or variant 0 of an A/B test), and a Y-value representing an outcome (e.g., conversions). Aspects of the present disclosure can generate table 402 of paired differences based on the table 400 of input data. Table 402 of paired differences can be an i=K selected set of feature values (e.g., where all four feature values in table 400 of input data are evaluated for their collective explanatory and/or predictive power). Accordingly, table 402 of paired differences includes each combination of gender, age, race, and location (note, for brevity, not every combination of the four feature values is explicitly shown in table 402). Furthermore, table 402 of paired differences further includes a $Y_{T=1}$ column representing a collective outcome (e.g., conversion) for the T=1 variant and a $Y_{T=0}$ column representing a collective outcome (e.g., conversion) for the T=0 variant. Finally, the table 402 of paired differences includes a d column measuring the difference between $Y_{T=1}$ and $Y_{T=0}$ for each combination. Larger d-values can indicate a higher explanatory power of a given feature set combination for explaining differences in outcomes between different testing variants in A/B testing.

The table 402 of paired differences can be used in the method 300 of FIG. 3 by determining the average d-value in operation 310, determining if the average d-value is statistically significant in operations 312 and 314, and if so, adding the i=K set of feature values to the candidate list of feature value sets. Conversely, if not statistically significant, the i=K set of feature values can be pruned from candidate list of feature value sets.

FIG. 5 illustrates tables generated by population strata modeling, in accordance with some embodiments of the present disclosure. First table 500 can represent a first run of the method 300 of FIG. 3 with i=1, second table 502 can represent a second run of the method 300 of FIG. 3 with i=2, and third table 504 can represent a third run of the method 300 of FIG. 3 with i=3. As can be seen, the tables in FIG. 5 include the example features discussed in the FIG. 4. For each combination of feature values in first table 500, second table 502, and third table 504, there is an associated d-value. Furthermore, for feature values with more than two sub-categories, aspects of the present disclosure can utilize OR functions to isolate each combination of sub-categories. Accordingly, as shown in FIG. 5, aspects of the present disclosure can search for a feature value set that results in the largest (and statistically significant) d-value by iteratively evaluating different combinations of features.

Figure 6A:
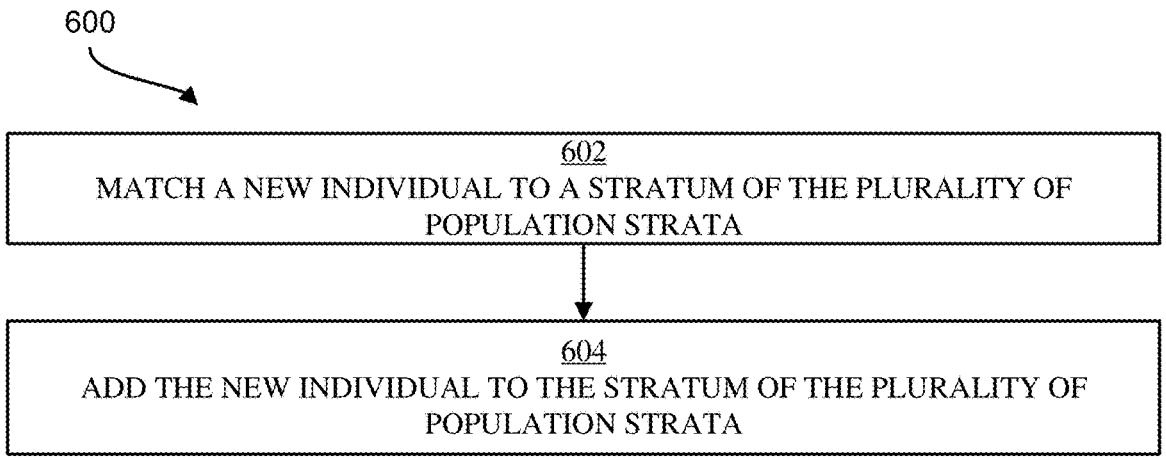
FIG. 6A illustrates a flowchart of an example method for matching a new individual to one or more of the plurality of population strata, in accordance with some embodiments of the present disclosure.

FIG. 6A illustrates a flowchart of an example method 600 for matching a new individual to one or more of the plurality of population strata 106, in accordance with some embodiments of the present disclosure. In some embodiments, the method 600 is implemented by a computer, a server, a processor, a data processing system (e.g., data processing system 102, remote data processing system 142 of FIG. 1), a user device (e.g., known user device 132, new user device 138 of FIG. 1), or another configuration of hardware and/or software. In some embodiments, the method 600 occurs as part of the method 200 of FIG. 2 (e.g., between operations of the method 200, after a final operation of the method 200, etc.).

Operation 602 includes matching a new individual (e.g., associated with a new user device 138) to a stratum 108 of the plurality of population strata 106. In some embodiments, the new individual is matched to one and only one stratum 108 (e.g., hard matching), whereas in other embodiments, the new individual is matched to two or more stratum 108 (e.g., soft matching). Operation 604 includes adding the new individual to one of the stratum 108 of the plurality of population strata 106. In embodiments utilizing soft matching, the new individual can be added to a highest ranked (e.g., by probability, accuracy, confidence, etc.) stratum 108 or a user-selected stratum 108 of the two or more candidate stratum 108.

Figure 6B:
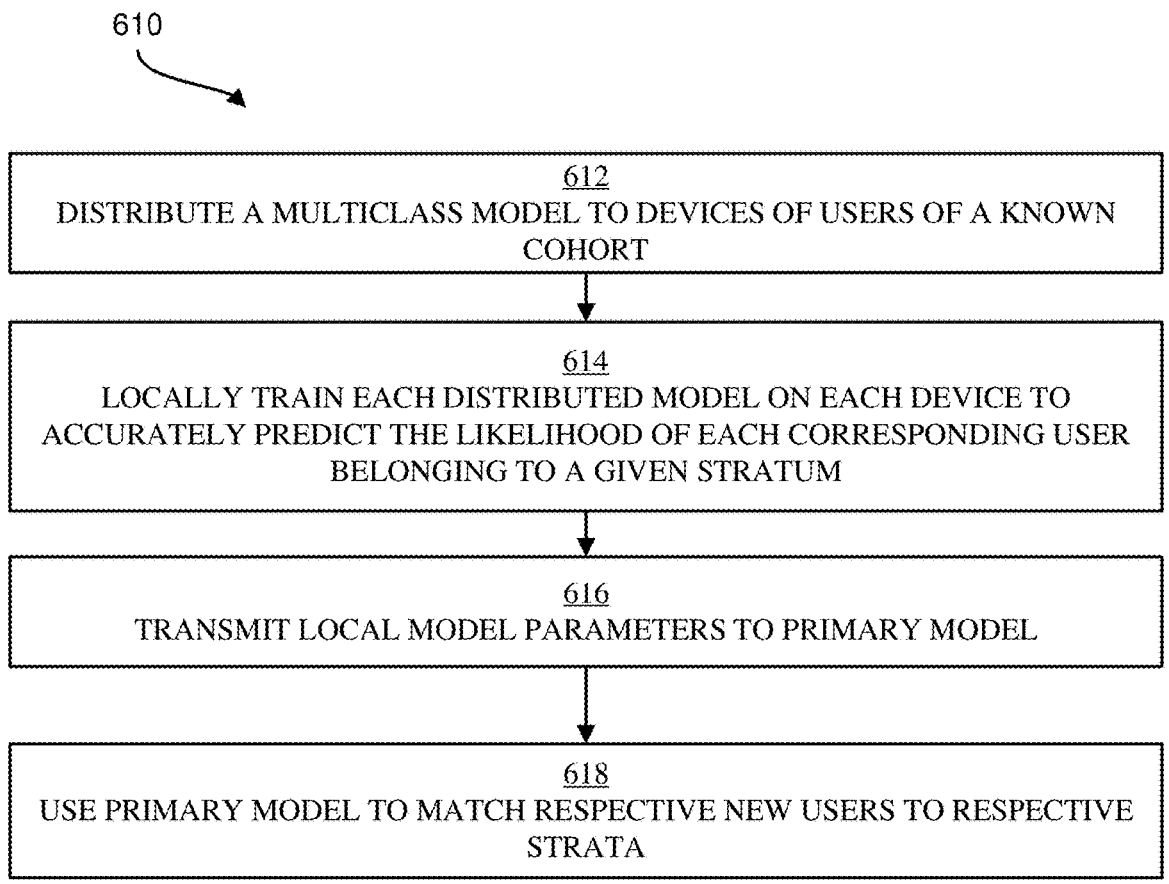
FIG. 6B illustrates a flowchart of an example method for distributed population strata model training, in accordance with some embodiments of the present disclosure.

FIG. 6B illustrates a flowchart of an example method 610 for distributed population strata partitioning model training, in accordance with some embodiments of the present disclosure. In some embodiments, the method 610 is implemented by a computer, a server, a processor, a data processing system (e.g., data processing system 102, remote data processing system 142 of FIG. 1), a user device (e.g., known user device 132, new user device 138 of FIG. 1), or another configuration of hardware and/or software. In some embodiments, the method 610 occurs prior to the method 600 of FIG. 6A.

Operation 612 includes distributing a multiclass model (e.g., local population strata partitioning model 118-1) to devices of users of a known cohort (e.g., known user devices 132). Operation 614 includes locally training each distributed model on each device to accurately predict a likelihood of each corresponding user belonging to a given stratum 108 of the plurality of population strata 106. In some embodiments, operation 614 utilizes user data 136-1 generated by the known user devices 132 to assist in training the local population strata partitioning model 118-1.

Operation 616 includes transmitting local model parameters (e.g., model parameters associated with the local population strata partitioning model 118-1) to the primary model (e.g., population strata partitioning model 118). Operation 618 includes using the primary model (e.g., population strata partitioning model 118) to match respective new users to one or more stratum 108.

Figure 7:
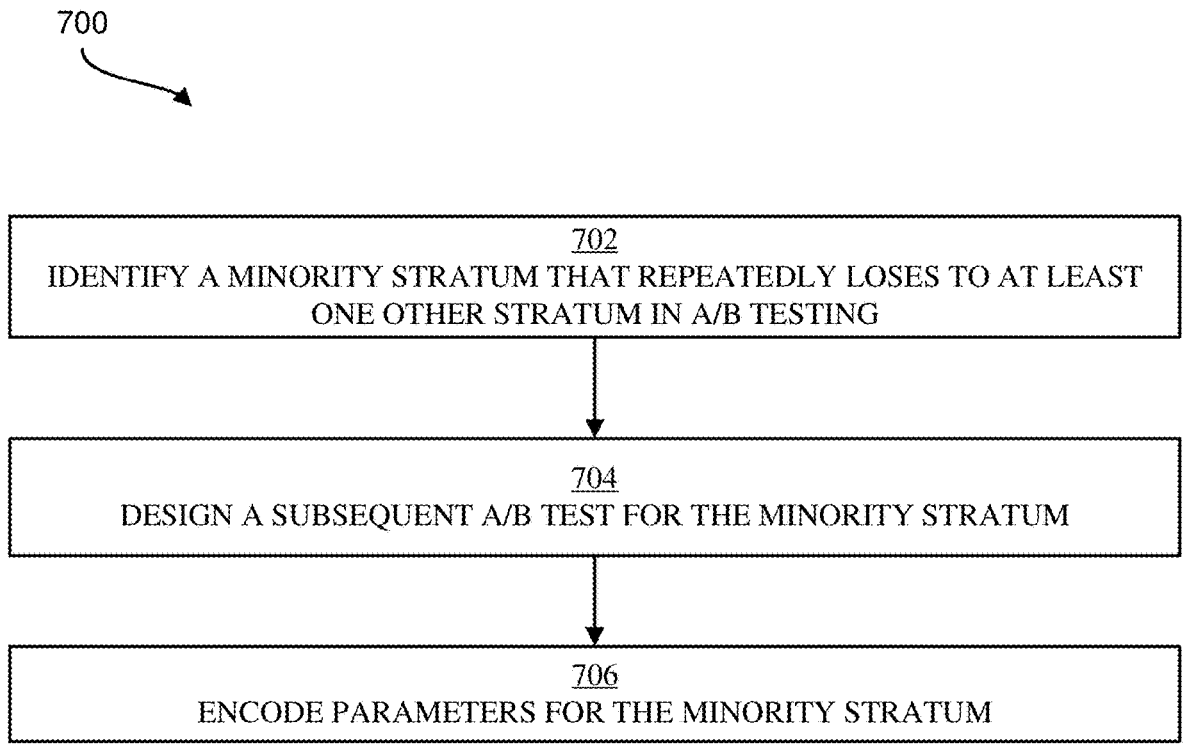
FIG. 7 illustrates a flowchart of an example method for redesigning A/B tests for a minority stratum, in accordance with some embodiments of the present disclosure.

FIG. 7 illustrates a flowchart of an example method 700 for redesigning A/B tests 120 for a minority stratum 130, in accordance with some embodiments of the present disclosure. In some embodiments, the method 700 is implemented by a computer, a server, a processor, a data processing system (e.g., data processing system 102, remote data processing system 142 of FIG. 1), a user device (e.g., known user device 132, new user device 138 of FIG. 1), or another configuration of hardware and/or software. In some embodiments, the method 700 occurs as part of the method 200 of FIG. 2 (e.g., between operations of the method 200, after the method 200, etc.).

Operation 702 includes identifying a minority stratum 130 that repeatedly loses to at least one other stratum 108 in A/B tests 120. In some embodiments, individuals of the minority stratum 130 must lose a predetermined number of times (e.g., a predetermined number of lost consecutive A/B tests 120, a predetermined ratio of lost A/B tests 120 to won A/B tests 120, etc.) to be characterized as the minority stratum 130.

Operation 704 includes designing a subsequent A/B test 120 for the minority stratum 130. Operation 704 can include identifying variants that may be preferrable to individuals of the minority stratum 130. In some embodiments, operation 704 uses stratified randomization based on the minority stratum 130 and the at least one other stratum 108 identified in operation 702. Stratified randomization can refer to, for example, selecting equal representation from the minority stratum 130 and the at least one other stratum 108 in a subsequent A/B test 120. In some embodiments, operation 704 further includes implementing the subsequent A/B test 120. Advantageously, operation 704 can reduce time and resources associated with manually redefining A/B tests 120 for a minority stratum 130.

Operation 706 includes encoding parameters for the minority stratum 130 based on the subsequent A/B tests 120. Encoded parameters can be user behaviors 112, user conversions 114, and/or other parameters. The encoded parameters can be stored in A/B testing database 116, population strata partitioning model 118, and/or other aspects of the present disclosure.

Figure 8:
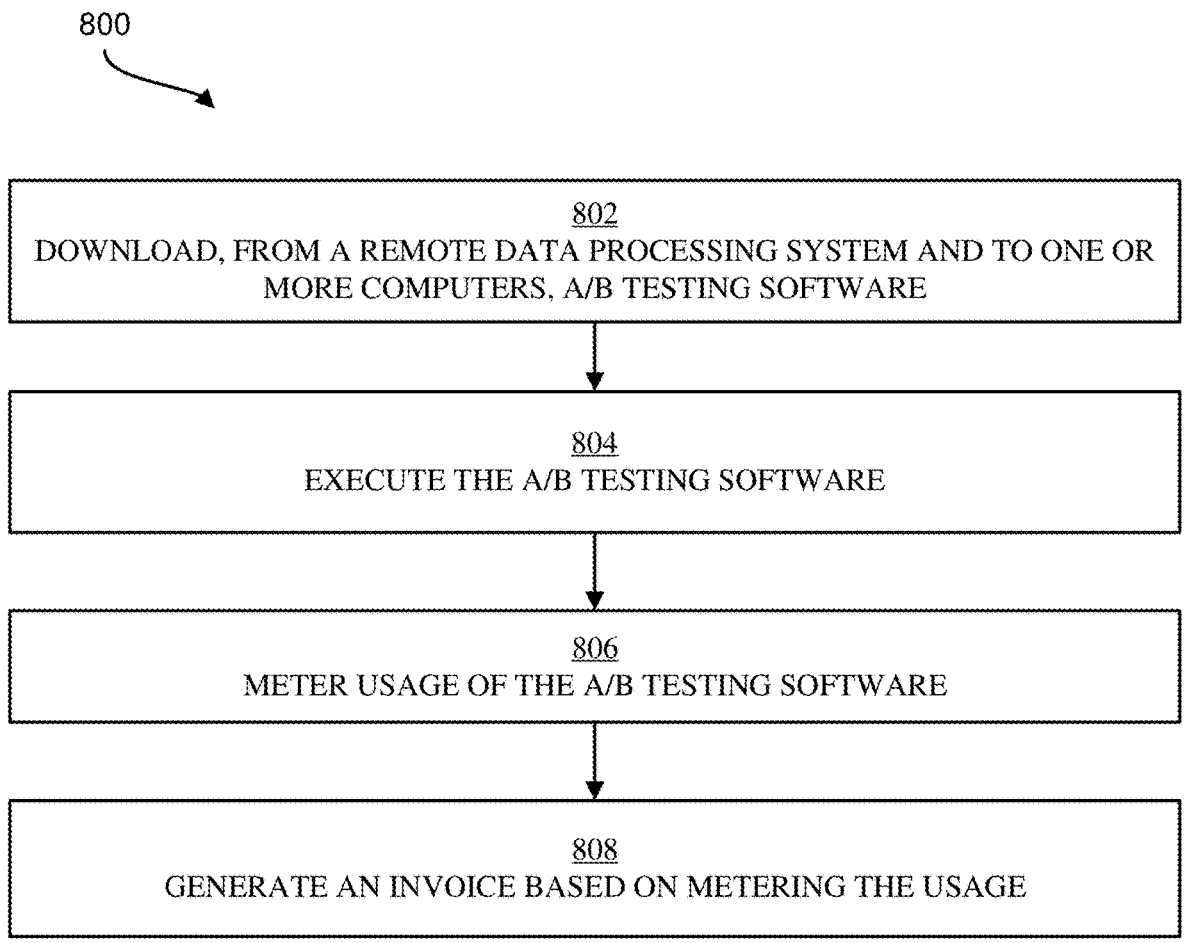
FIG. 8 illustrates a flowchart of an example method for downloading, deploying, metering, and billing usage of an A/B testing software suite, in accordance with some embodiments of the present disclosure.

FIG. 8 illustrates a flowchart of an example method 800 for downloading, deploying, metering, and billing usage of A/B testing software 104, in accordance with some embodiments of the present disclosure. In some embodiments, the method 800 is implemented by a computer, a server, a processor, a data processing system (e.g., data processing system 102, remote data processing system 142 of FIG. 1), a user device (e.g., known user device 132, new user device 138 of FIG. 1), or another configuration of hardware and/or software. In some embodiments, the method 800 occurs contemporaneously with the other method discussed in the present disclosure.

Operation 802 includes downloading, from a remote data processing system 142 and to one or more computers (e.g., data processing system 102), A/B testing software 104. Operation 804 includes executing the A/B testing software 104. Operation 804 can include performing any of the methods discussed herein. Operation 806 includes metering usage of the A/B testing software 104. Usage can be metered by, for example, an amount of time the A/B testing software 104 is used, a number of workstations deploying the A/B testing software 104, an amount of resources consumed by implementing the A/B testing software 104, and/or other usage metering metrics. Operation 808 includes generating an invoice based on metering the usage.

Figure 9:
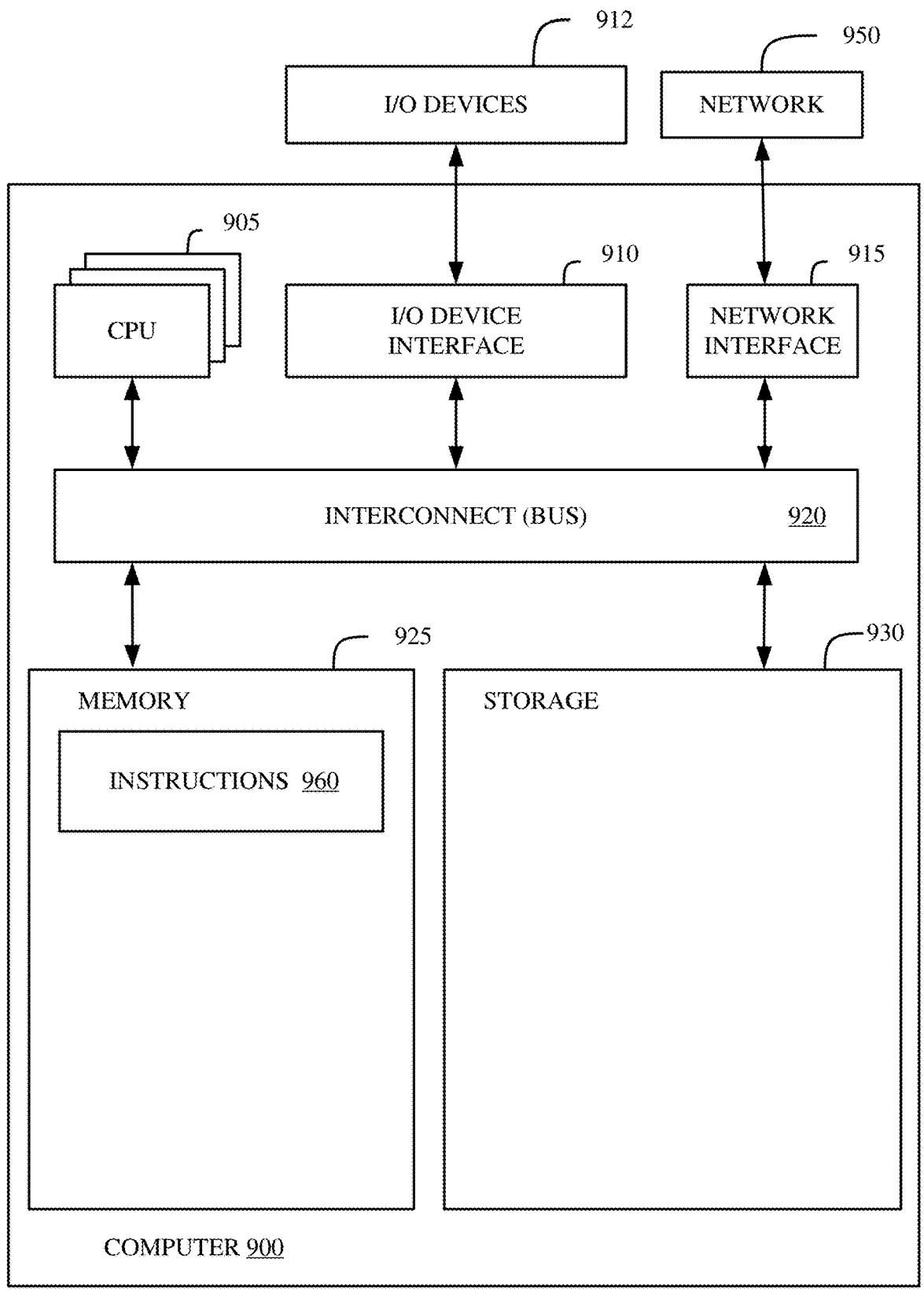
FIG. 9 illustrates a block diagram of an example computer, in accordance with some embodiments of the present disclosure.

FIG. 9 illustrates a block diagram of an example computer 900 in accordance with some embodiments of the present disclosure. In various embodiments, computer 900 can perform any or all portions of the methods described in FIGS. 2-3 and/or 6-8 and/or implement the functionality discussed in FIGS. 1 and/or 4-5. In some embodiments, computer 900 receives instructions related to the aforementioned methods and functionalities by downloading processor-executable instructions from a remote data processing system (e.g., remote data processing system 142 of FIG. 1) via network 950. In other embodiments, computer 900 provides instructions for the aforementioned methods and/or functionalities to a client machine (e.g., data processing system 102, known user device 132, and/or new user device 138 of FIG. 1) such that the client machine executes the method, or a portion of the method, based on the instructions provided by computer 900. In some embodiments, the computer 900 is incorporated into (or functionality similar to computer 900 is virtually provisioned to) one or more entities illustrated in FIG. 1 and/or other aspects of the present disclosure (e.g., remote data processing system 142, data processing system 102, known user device 132, and/or new user device 138).

Computer 900 includes memory 925, storage 930, interconnect 920 (e.g., a bus), one or more CPUs 905 (also referred to as processors herein), I/O device interface 910, I/O devices 912, and network interface 915.

Each CPU 905 retrieves and executes programming instructions stored in memory 925 or storage 930. Interconnect 920 is used to move data, such as programming instructions, between the CPUs 905, I/O device interface 910, storage 930, network interface 915, and memory 925. Interconnect 920 can be implemented using one or more buses. CPUs 905 can be a single CPU, multiple CPUs, or a single CPU having multiple processing cores in various embodiments. In some embodiments, CPU 905 can be a digital signal processor (DSP). In some embodiments, CPU 905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 925 is generally included to be representative of a random-access memory (e.g., static random-access memory (SRAM), dynamic random-access memory (DRAM), or Flash). Storage 930 is generally included to be representative of a non-volatile memory, such as a hard disk drive, solid state device (SSD), removable memory cards, optical storage, or flash memory devices. In an alternative embodiment, storage 930 can be replaced by storage area-network (SAN) devices, the cloud, or other devices connected to computer 900 via I/O device interface 910 or network 950 via network interface 915.

In some embodiments, memory 925 stores instructions 960. However, in various embodiments, instructions 960 are stored partially in memory 925 and partially in storage 930, or they are stored entirely in memory 925 or entirely in storage 930, or they are accessed over network 950 via network interface 915.

Instructions 960 can be computer-readable and computer-executable instructions for performing any portion of, or all of, the methods of FIGS. 2-3 and/or 6-8 and/or implement the functionality discussed in FIGS. 1 and/or 4-5. Although instructions 960 are shown in memory 925, instructions 960 can include program instructions collectively stored across numerous computer-readable storage media and executable by one or more CPUs 905.

In various embodiments, I/O devices 912 include an interface capable of presenting information and receiving input. For example, I/O devices 912 can present information to a user interacting with computer 900 and receive input from the user.

Computer 900 is connected to network 950 via network interface 915. Network 950 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
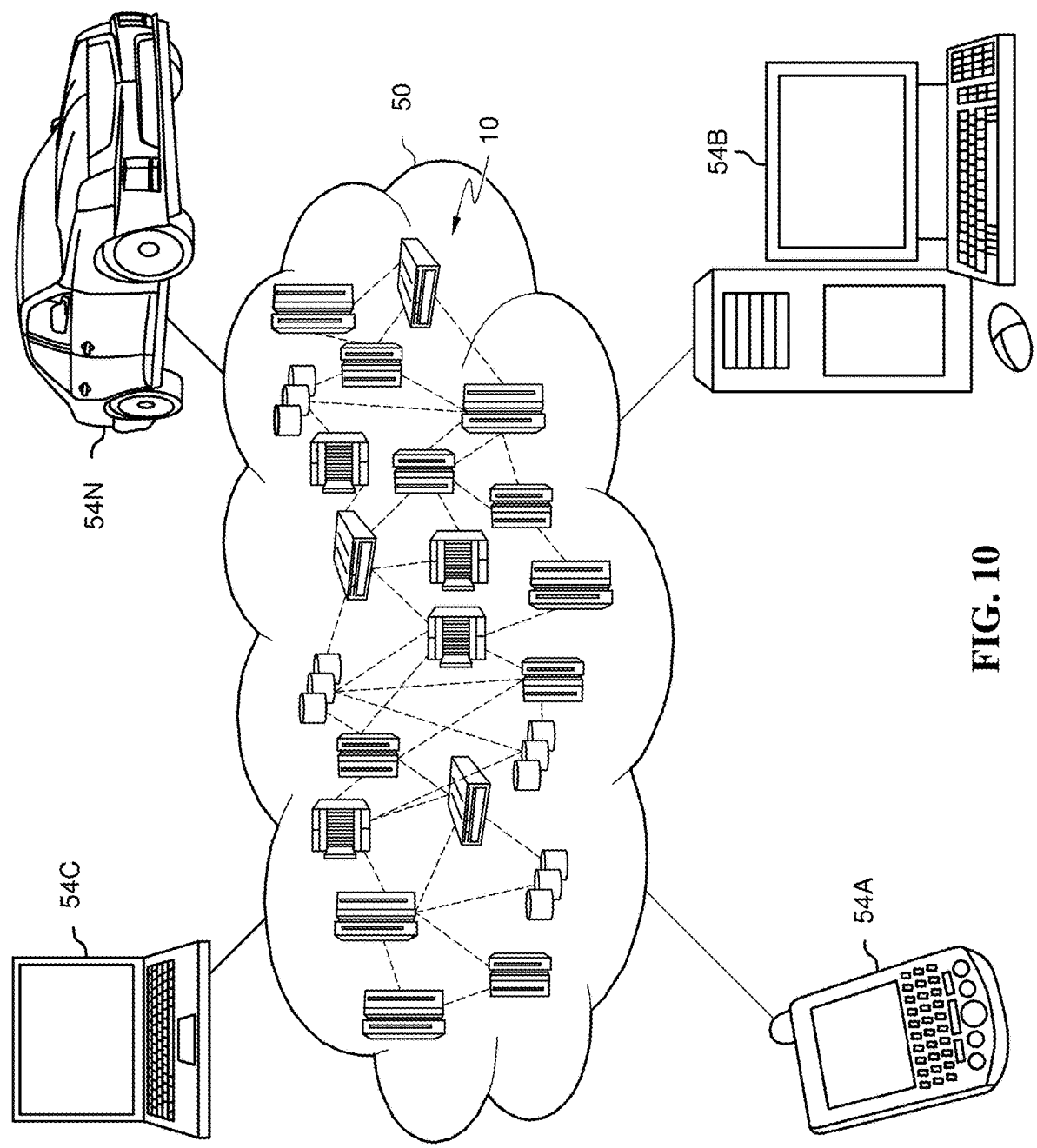
FIG. 10 depicts a cloud computing environment, in accordance with some embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
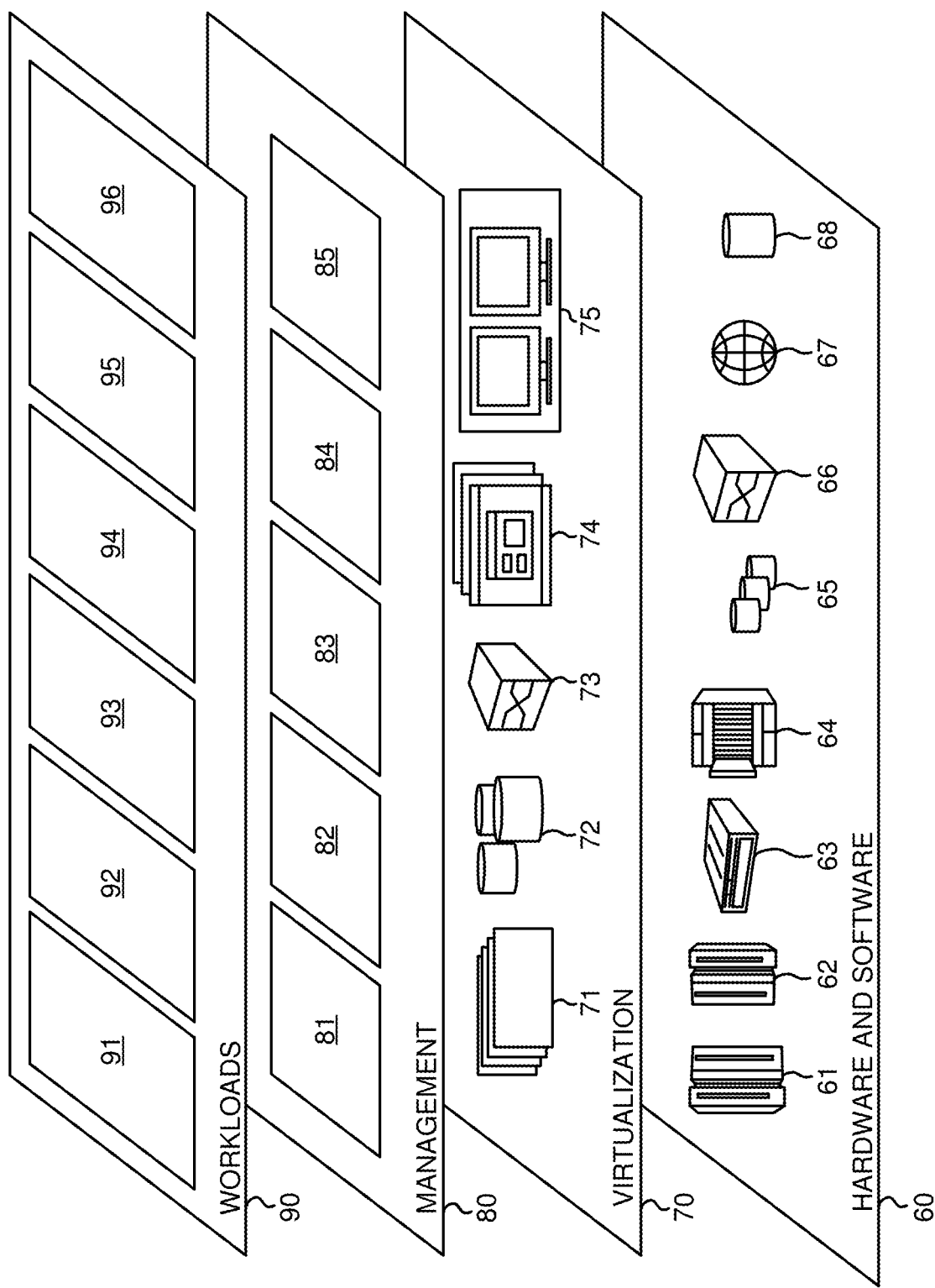
FIG. 11 depicts abstraction model layers, in accordance with some embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and A/B testing software tools 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 960 of FIG. 9 and/or any software configured to perform any portion of the methods described with respect to FIGS. 2-3 and/or 6-8 and/or implement the functionality discussed in FIGS. 1 and/or 4-5 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes identifying, in an A/B testing database, a set of feature values with a statistically significant difference in A/B testing outcomes above a threshold; partitioning records in the A/B testing database into a plurality of population strata according to the set of feature values; performing A/B testing; and identifying heterogeneous outcomes of the A/B testing for respective strata of the plurality of population strata.

Example 2 includes the method of example 1, including or excluding optional features. In this example, the method further comprising: identifying a minority stratum that repeatedly loses to at least one other stratum in the A/B testing; designing a subsequent A/B test for the minority stratum using stratified randomization of the minority stratum and the at least one other stratum; and encoding results of the subsequent A/B test in the A/B testing database.

Example 3 includes the method of any one of examples 1 to 2, including or excluding optional features. In this example, the method further comprising: distributing local versions of a population strata partitioning model to a plurality of known user devices; training the distributed local versions of the population strata partitioning model using data of the known user devices; aggregating, at the population strata partitioning model, model parameters from the distributed versions of the population strata partitioning model; matching a new individual to a stratum of the plurality of population strata using the population strata partitioning model having aggregated parameters from the distributed local versions of the population strata partitioning model; and adding the new individual to the stratum in the A/B testing database. Optionally, the new individual is matched to one and only one stratum of the plurality of population strata. In an alternative option, the new individual is matched to multiple strata of the plurality of population strata, wherein each of the multiple strata includes a metric associated with the match.

Example 4 includes the method of any one of examples 1 to 3, including or excluding optional features. In this example, the method further comprising: encoding user behaviors and user conversions of respective users in the plurality of population strata for the A/B testing. Optionally, the method further comprising: automatically triggering a new A/B test in response to a detected divergence in user conversions, wherein the detected divergence comprises a difference above a second threshold between an expected conversion ratio and an observed conversion ratio, wherein the new A/B test is based on the plurality of population strata, the user behaviors, and the user conversions.

Example 5 includes the method of any one of examples 1 to 4, including or excluding optional features. In this example, the method is performed by one or more computers according to A/B testing software that is downloaded to the one or more computers from a remote data processing system. Optionally, the method further comprises: metering a usage of the A/B testing software; and generating an invoice based on metering the usage.

Example 6 is a system. The system includes one or more computer readable storage media storing program instructions; and one or more processors which, in response to executing the program instructions, are configured to perform a method according to any one of examples 1-5, including or excluding optional features.

Example 7 is a computer program product. The computer program product includes one or more computer readable storage media, and program instructions collectively stored on the one or more computer readable storage media, the program instructions comprising instructions configured to cause one or more processors to perform a method according to any one of examples 1-5, including or excluding optional features.

What is claimed is:

1. A computer-implemented method comprising:
distributing local versions of a population strata partitioning model to a plurality of known user devices, each known user device of the plurality of known devices comprising a secure hardware-based enclave;
locally training the distributed local versions of the population strata partitioning model within the secure hardware-based enclave of each known user device and using device-specific data, wherein the secure hardware-based enclave is a single, common, continuous security perimeter providing computational security;
returning model parameters from the distributed local versions of the population strata partitioning model to the population strata partitioning model in a data processing system;
aggregating, at the population strata partitioning model, the model parameters;
identifying, in an A/B testing database and using the population strata partitioning model, a set of feature values with a statistically significant difference in A/B testing outcomes above a threshold;
partitioning records in the A/B testing database into a plurality of population strata according to the identified set of feature values;
performing A/B testing on each of the plurality of population strata independently; and
identifying heterogeneous outcomes of the A/B testing for respective strata of the plurality of population strata to enable future A/B tests to be designed for specific population strata.

2. The method of claim 1, further comprising:
identifying a minority stratum that repeatedly loses to at least one other stratum in the A/B testing;
designing a subsequent A/B test for the minority stratum using stratified randomization of the minority stratum and the at least one other stratum; and
encoding results of the subsequent A/B test in the A/B testing database.

3. The method of claim 1, further comprising:
matching a new individual to a stratum of the plurality of population strata using the population strata partitioning model having aggregated parameters from the distributed local versions of the population strata partitioning model; and adding the new individual to the stratum in the A/B testing database.

4. The method of claim 3, wherein the new individual is matched to one and only one stratum of the plurality of population strata.

5. The method of claim 3, wherein the new individual is matched to multiple strata of the plurality of population strata, wherein each of the multiple strata includes a metric associated with the match.

6. The method of claim 1, further comprising:
encoding user behaviors and user conversions of respective users in the plurality of population strata for the A/B testing.

7. The method of claim 6, further comprising:
automatically triggering a new A/B test in response to a detected divergence in user conversions, wherein the detected divergence comprises a difference above a second threshold between an expected conversion ratio and an observed conversion ratio, wherein the new A/B test is based on the plurality of population strata, the user behaviors, and the user conversions.

8. The method of claim 1, wherein the method is performed by one or more computers according to A/B testing software that is downloaded to the one or more computers from a remote data processing system.

9. The method of claim 8, wherein the method further comprises:
metering a usage of the A/B testing software; and
generating an invoice based on metering the usage.

10. A system comprising:
one or more computer readable storage media storing program instructions; and
one or more processors which, in response to executing the program instructions, are configured to perform a method comprising:
distributing local versions of a population strata partitioning model to a plurality of known user devices, each known user device of the plurality of known devices comprising a secure hardware-based enclave;
locally training the distributed local versions of the population strata partitioning model n within the secure hardware-based enclave of each known user device and using device-specific data, wherein the secure hardware-based enclave is a single, common, continuous security perimeter providing computational security;
returning model parameters from the distributed local versions of the population strata partitioning model to the population strata partitioning model in a data processing system;
aggregating, at the population strata partitioning model, the model parameters;
identifying, in an A/B testing database and using the population strata partitioning model, a set of feature values with a statistically significant difference in A/B testing outcomes above a threshold;
partitioning records in the A/B testing database into a plurality of population strata according to the identified set of feature values;
performing A/B testing on each of the plurality of population strata independently; and identifying heterogeneous outcomes of the A/B testing for respective strata of the plurality of population strata to enable future A/B tests to be designed for specific population strata.

11. The system of claim 10, the method further comprising:
identifying a minority stratum that repeatedly loses to at least one other stratum in the A/B testing;
designing a subsequent A/B test for the minority stratum using stratified randomization of the minority stratum and the at least one other stratum; and
encoding results of the subsequent A/B test in the A/B testing database.

12. The system of claim 10, the method further comprising:
matching a new individual to a stratum of the plurality of population strata using the population strata partitioning model having aggregated parameters from the distributed local versions of the population strata partitioning model; and
adding the new individual to the stratum in the A/B testing database.

13. The system of claim 12, wherein the new individual is matched to one and only one stratum of the plurality of population strata.

14. The system of claim 12, wherein the new individual is matched to multiple strata of the plurality of population strata, wherein each of the multiple strata includes a metric associated with the match.

15. The system of claim 10, the method further comprising:
encoding user behaviors and user conversions of respective users in the plurality of population strata for the A/B testing.

16. The system of claim 15, the method further comprising:
automatically triggering a new A/B test in response to a detected divergence in user conversions, wherein the detected divergence comprises a difference above a second threshold between an expected conversion ratio and an observed conversion ratio, wherein the new A/B test is based on the plurality of population strata, the user behaviors, and the user conversions.

17. A computer program product comprising one or more computer readable storage media, and program instructions collectively stored on the one or more computer readable storage media, the program instructions comprising instructions configured to cause one or more processors to perform a method comprising:
distributing local versions of a population strata partitioning model to a plurality of known user devices, each known user device of the plurality of known devices comprising a secure hardware-based enclave;
locally training the distributed local versions of the population strata partitioning model within the secure hardware-based enclave of each known user device and using device-specific data, wherein the secure hardware-based enclave is a single, common, continuous security perimeter providing computational security;
returning model parameters from the distributed local versions of the population strata partitioning model to the population strata partitioning model in a data processing system;
aggregating, at the population strata partitioning model, the model parameters;
identifying, in an A/B testing database and using the population strata partitioning model, a set of feature values with a statistically significant difference in A/B testing outcomes above a threshold;

partitioning records in the A/B testing database into a plurality of population strata according to the identified set of feature values;

performing A/B testing on each of the plurality of population strata independently; and identifying heterogeneous outcomes of the A/B testing for respective strata of the plurality of population strata to enable future A/B tests to be designed for specific population strata.

18. The computer program product of claim 17, the method further comprising:

identifying a minority stratum that repeatedly loses to at least one other stratum in the A/B testing;

designing a subsequent A/B test for the minority stratum using stratified randomization of the minority stratum and the at least one other stratum; and encoding results of the subsequent A/B test in the A/B testing database.

19. The computer program product of claim 17, the method further comprising:

matching a new individual to a stratum of the plurality of population strata using the population strata partitioning model having aggregated parameters from the distributed local versions of the population strata partitioning model; and adding the new individual to the stratum in the A/B testing database, wherein the new individual is matched to one selected from a group consisting of: one and only one stratum of the plurality of population strata, and multiple strata of the plurality of population strata, wherein each of the multiple strata includes a metric associated with the match.

20. The computer program product of claim 17, the method further comprising:

encoding user behaviors and user conversions of respective users in the plurality of population strata for the A/B testing; and automatically triggering a new A/B test in response to a detected divergence in user conversions, wherein the detected divergence comprises a difference above a second threshold between an expected conversion ratio and an observed conversion ratio, wherein the new A/B test is based on the plurality of population strata, the user behaviors, and the user conversions.

* * * * *